No. 700,943. Patented May 27, 1902.
E. KEMPSHALL.
GOLF BALL.
(Application filed Apr. 16, 1902.)
(No Model.)
Fig. 1.
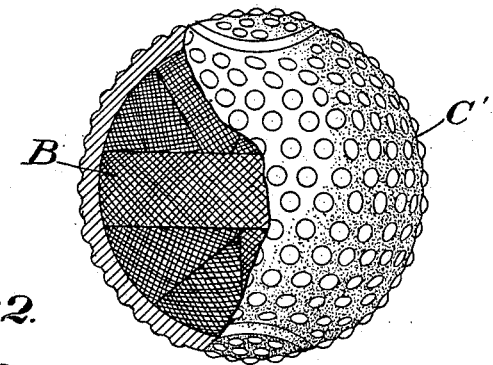
Fig. 2.
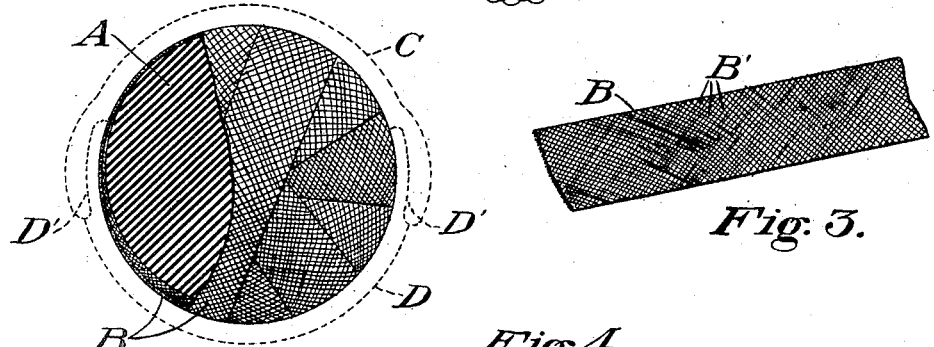
Fig. 3.
Fig. 4.
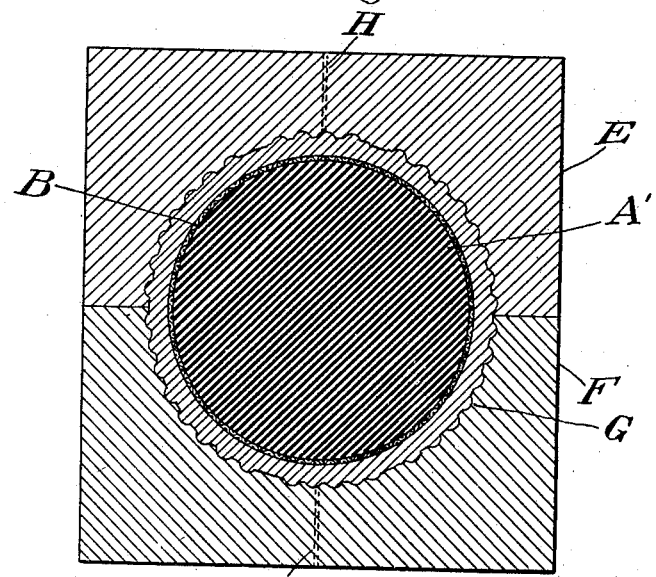
Witnesses:
Robert Head
H. C. Abbott
Inventor:
Eleazer Kempshall,
By his Attorney,
F. H. Richards.

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

GOLF-BALL.

SPECIFICATION forming part of Letters Patent No. 700,943, dated May 27, 1902.

Application filed April 16, 1902. Serial No. 103,220. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Golf-Balls, of which the following is a specification.

This invention relates to balls such as used in golf and other games; and its object is to increase the efficiency and durability while reducing the cost of the ball.

In the drawings forming a part of this specification, Figure 1 is a view, partly in section, of my improved ball. Fig. 2 illustrates a stage in the process of manufacturing the ball. Fig. 3 illustrates a section of tape such as I preferably use in constructing the ball. Fig. 4 illustrates the final stage in its manufacture.

In the several views similar parts are designated by similar characters of reference.

I preferably use a sphere A, Fig. 2, of uncured or partially-cured rubber, and over this I wind somewhat loosely and continuously in different directions a tape B, so as to form a jacket upon said uncured-rubber sphere. Over the ball thus formed I place plastic material, such as gutta-percha or celluloid, preferably the latter, wherewith to form a hard shell. This material may be applied in the form of cups C and D, which may have overlapping, telescopic, or lap-jointed rims, as at D'. The ball thus assembled I place in a mold consisting of parts E and F, the ball being preferably somewhat undersize, so that it may slip readily into the mold. I then heat the mold to an extent to cure the soft-rubber core A. In curing said core expands and swells the fabric jacket B and also forces the celluloid shell-casing outwardly, causing it to fit the mold, and especially the pits G therein, whereby the ball may be brambled or otherwise embossed. The size of the original rubber sphere A is such and the other parts are so proportioned that the described expansion of the rubber in the core causes the ball to fill the mold, subjects the celluloid evenly and radially to high compression between the rubber and the walls of the mold, causes the fabric envelop B to become embedded in the celluloid, and preferably also puts the rubber core A itself in a state of compression within its confines, or, in other words, a surplus of rubber may be employed, the effect of confining which within a shell is to give it a permanent tendency to rupture the shell; and since the mold is allowed to cool while the ball is confined therein the celluloid hardens, and therefore is enabled to restrain the core or hold it in a state of permanent compression. If desired, a vent at H may be provided in the mold, so as to prevent rupture thereof and also to regulate the degree of compression attained by the soft-rubber core A'.

The deeply-overlapping shell-cups at D' may be so welded and compacted by the expansive action of the rubber as it cures as to form a practically continuous or unjointed shell all over the ball, which is a desideratum, since the liability of the same to become ruptured when subjected to severe usage is minimized.

The threads of the tape preferably extend diagonally, as at B', so as to enable the tape to stretch somewhat as the rubber core confined therein expands.

It will be seen that as a result of confining the core the latter tends to assume a true spherical form and to become accurately centered within the complete distended shell C' of celluloid or gutta-percha.

Variations may be resorted to within the scope of my invention.

Having described my invention, I claim—

1. A playing-ball comprising a soft-rubber sphere and a shell of plastic material thereon, strips of fabric extending continuously around said sphere in different directions and being vulcanized thereto and said rubber sphere being held under compression by said fabric strips and shell.

2. A playing-ball comprising a soft-rubber sphere and a shell of celluloid thereon, strips of fabric extending continuously around said sphere in different directions and being vulcanized thereto, said rubber sphere being held under compression by said fabric strips and shell.

3. A playing-ball comprising a soft-rubber sphere and a shell of plastic material thereon, strips of fabric extending continuously around said sphere in different directions and being vulcanized thereto, and said rubber sphere being held under compression by said fabric strips and shell, the threads of said fabric strips extending diagonally of said strips.

ELEAZER KEMPSHALL.

Witnesses:
B. C. STICKNEY,
JOHN O. SEIFERT.